(12) United States Patent
Shimazawa et al.

(10) Patent No.: US 8,395,974 B1
(45) Date of Patent: Mar. 12, 2013

(54) THERMALLY ASSISTED MAGNETIC RECORDING HEAD

(75) Inventors: Koji Shimazawa, Tokyo (JP); Tatsuya Shimizu, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/398,971

(22) Filed: Feb. 17, 2012

(51) Int. Cl.
*G11B 11/00* (2006.01)

(52) U.S. Cl. ................................ 369/13.33; 369/112.27

(58) Field of Classification Search ............... 369/13.33, 369/13.13, 13.32, 13.24, 13.14, 13.02, 13.12, 369/13.01, 13.35, 13.17, 112.01, 112.27; 360/59, 125.31, 125.74
See application file for complete search history.

(56) References Cited

U.S. PATENT DOCUMENTS

| | | | |
|---|---|---|---|
| 8,000,178 B2 | 8/2011 | Shimazawa et al. | |
| 8,169,731 B2 * | 5/2012 | Mizuno et al. | 360/59 |
| 8,264,919 B2 * | 9/2012 | Komura et al. | 369/13.33 |
| 2012/0026846 A1 * | 2/2012 | Komura et al. | 369/13.33 |
| 2012/0120781 A1 * | 5/2012 | Komura et al. | 369/13.33 |

FOREIGN PATENT DOCUMENTS

| | | |
|---|---|---|
| JP | A-2001-255254 | 9/2001 |
| JP | A-2003-114184 | 4/2003 |

* cited by examiner

*Primary Examiner* — Ali Neyzari
(74) *Attorney, Agent, or Firm* — Posz Law Group, PLC

(57) ABSTRACT

A thermally-assisted magnetic recording head of the present invention includes waveguide 2 that includes core 3 through which light from a laser beam source propagates and cladding 4 that surrounds the periphery of the core 3, magnetic pole 10 that generates magnetic flux toward magnetic recording medium 25, plasmon generator 16 that faces a part of the core 3 and extends to the ABS, that couples to propagation light that propagates through the core 3 in a surface plasmon mode, and that generates surface plasmon, near-field light generating part 16$a$ that is an end part of the plasmon generator on the ABS side and that generates near-field light from the surface plasmon, heat generation element 20 that thermally expands the thermally-assisted magnetic recording head, and dielectric body 40 that covers at least a part of the plasmon generator positioned on the ABS.

4 Claims, 8 Drawing Sheets

Fig.7

| Amount of Back-off (BO) (mW) | Dummy writing (DW) condition | | | Result 1 | Result 2 |
|---|---|---|---|---|---|
| | Assumed Spacing amount before driving a laser beam source (nm) | Driving current of laser beam source | Duration of DW (sec) | Decrement of driving current of laser beam source which impregnates SNR before and after dummy writing (BO is constant) (%) | Decrement of driving current of laser beam source which impregnates SNR before and after dummy writing (BO is 50mW after dummy writing) (%) |
| 50 | 6 | 10% reduction compared to driving current of laser beam source which impregnates SNR | 30<br>60<br>90<br>120<br>180 | 1.1<br>1.3<br>1.9<br>2.2<br>2.3 | —<br>—<br>—<br>—<br>— |
| 75 | 9 | 10% reduction compared to driving current of laser beam source which impregnates SNR | 30<br>60<br>90<br>120<br>180 | 2.2<br>3.1<br>9.3<br>11.4<br>11.6 | 2.6<br>4.1<br>11.8<br>14.6<br>15.2 |
| 100 | 12 | 10% reduction compared to driving current of laser beam source which impregnates SNR | 30<br>60<br>90<br>120<br>180 | 2.8<br>5.3<br>12.3<br>15.3<br>16.2 | 3.5<br>6.7<br>15.8<br>19.7<br>20.8 |
| 100 | 12 | 10% increase compared to driving current of laser beam source which impregnates SNR | 30<br>60<br>90<br>120<br>180 | 4.2<br>7.8<br>14.8<br>16.8<br>17.1 | 5.2<br>9.6<br>17.8<br>21.4<br>21.8 |

THERMALLY ASSISTED MAGNETIC RECORDING HEAD

BACKGROUND OF THE INVENTION

1. Field of the Invention

The present invention relates to thermally-assisted magnetic recording heads that are mainly used for hard disk drive devices.

2. Description of the Related Art

Performance improvement of magnetic recording heads are demanded in conjunction with further condensing of recording density in hard disk drives (HDD). As magnetic recording heads, a composite-type magnetic recording head is widely utilized, the composite-type magnetic recording head having a structure in which a reproducing head including a magneto resistive effect element (MR element) for reading and a recording head including an induction-type electromagnetic transducer element for writing are laminated.

In magnetic recording, a magnetic recording medium, such as a magnetic disk and the like, is formed with an uncontinuous medium made from magnetic nanoparticles, and each magnetic nanoparticle has a single magnetic domain structure. Recording is performed using plurality of the nanoparticles. In order to increase recording density, unevenness of boundaries of recording regions should be reduced. In order to achieve that, the size of the magnetic nanoparticles should be decreased; however, the volume decrease of the magnetic nanoparticles accompanies the deterioration of thermal stability. A value that indicates thermal stability can be obtained by KuV/kBT. Herein, Ku is anisotropy energy of magnetic nanoparticles, V is the volume of one piece of the magnetic nanoparticles, kB is Boltzmann constant, and T is the absolute temperature. When the size of the magnetic nanoparticles is decreased, V is decreased and the value KuV/kBT that indicates thermal stability is decreased. Herein, it is considered that Ku may be increased to improve thermal stability; however, an increase of Ku accompanies an increase of coercive force. The size of a magnetic field generated by the magnetic recording head during recording is determined by saturation magnetic flux density of a nonmagnetic material of a core, and therefore coercive force of the magnetic recording medium is substantially limited.

As a method of resolving such thermal stability issue, a method of performing recording has been proposed. In the method, recording is performed while using a magnetic material having large Ku, applying simultaneously both a magnetic field and heat during recording, and decreasing coercive force. The method is called thermally-assisted magnetic recording. Thermally-assisted magnetic recording is similar to optical magnetic recording. However, in optical magnetic recording, spatial resolution depends on light; on the other hand, in thermally-assisted magnetic recording, spatial resolution depends on a magnetic field.

JP Laid-Open Patent Publication No. 2001-255254 discloses a technology of optical recording that uses a plasmon antenna that is configured with a metal scatterer and a film, the metal scatterer having a cone shape, a triangular shape, or the like formed on a substrate, the film made of a dielectric body or the like being formed around the scatterer. Also, JP Laid-Open Patent Publication No. 2003-114184 discloses a technology that generates further intense near-field light by letting a tip part of a plasmon antenna preferentially get close to a magnetic recording medium to concentrate charge. It has been known that, in the case of adopting such relevant technologies, conversion efficiency from propagation light incident from laser to near-field light is approximately 10%. Remaining energy of 90% may be reflected off an antenna surface, and may be absorbed by the antenna and be converted to thermally energy. Herein, the size of the plasmon antenna is set at the wavelength of light or less, so that the volume thereof becomes smaller and the temperature increase due to energy absorption of incident light becomes extremely larger. Due to such temperature increase, the problem that the plasmon antenna itself may melt occurs.

On the other hand, invented is a technology of coupling light to a metal via a buffer layer in a surface plasmon mode without directly irradiating the light to a plasmon antenna, the light propagating through a waveguide (U.S. Pat. No. 8,000, 178). The above-described structure is called a surface plasmon wave-guiding-type antenna. Because such structure has a feature that the volume of a plasmon antenna is large, the structure has an advantage that the temperature increase of the antenna during performance of the antenna is small.

In a surface plasmon wave-guiding-type antenna, the temperature increase during performance is small compared to relevant technologies as disclosed in JP Laid-Open Patent Publication No. 2001-255254 and JP Laid-Open Patent Publication No. 2003-114184; however, drawbacks due to heat generation have not been completely resolved. For example, due to heat generation of the antenna, a diamond-like carbon (DLC) film formed on an air bearing surface (ABS) is evaporated. With further progression of heat generation of the antenna, corrosion of a magnetic pole and missing of a cladding layer may occur because the DLC film is evaporated. In order to prevent the occurrence of such problems to the extent possible, temperature of the antenna need to be set low to the extent possible.

SUMMARY OF THE INVENTION

One of the objectives of the present invention is to provide a thermally-assisted magnetic recording head that allows to perform recording with small laser output.

A thermally-assisted magnetic recording head of the present invention includes a waveguide that includes a core through which light from a laser beam source propagates and a cladding that surrounds the periphery of the core, a magnetic pole that generates magnetic flux toward a magnetic recording medium, a plasmon generator that faces a part of the core and extends to the ABS, that couples to propagation light that propagates through the core in a surface plasmon mode, and that generates surface plasmon, a near-field light generating part that is an end part of the plasmon generator on the ABS side and that generates near-field light from the surface plasmon, a heat generation element that thermally expands the thermally-assisted magnetic recording head, and a dielectric body that covers at least a part of the plasmon generator positioned on the ABS.

The above-described objectives, features, and advantages, and other objectives, features, and advantages of the present invention become evident by reading the descriptions that are hereinafter described with reference to the attached drawings that illustrate the embodiments of the present invention.

BRIEF DESCRIPTION OF THE DRAWINGS

FIG. 7 is a table that illustrates the validation results of the dummy writing effect under various conditions.

DETAILED DESCRIPTION OF THE EXEMPLARY EMBODIMENT

Hereinafter, descriptions are given of an embodiment of the present invention with reference to the attached figures. Note, in the attached figures, the same reference numbers are assigned to the configurations having the same functions, and the descriptions of the configurations are occasionally omitted.

Figure 1A:
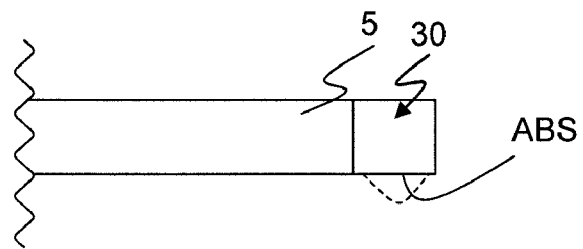
FIG. 1A is an appearance schematic view of a slider of the present invention.
Figure 1B:
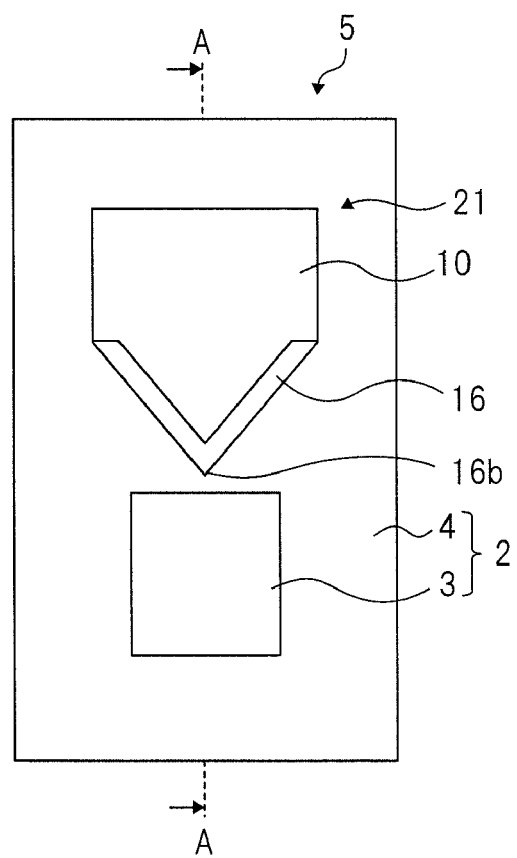
FIG. 1B is a schematic view of a thermally-assisted magnetic recording head from the perspective of an ABS.
Figure 1C:
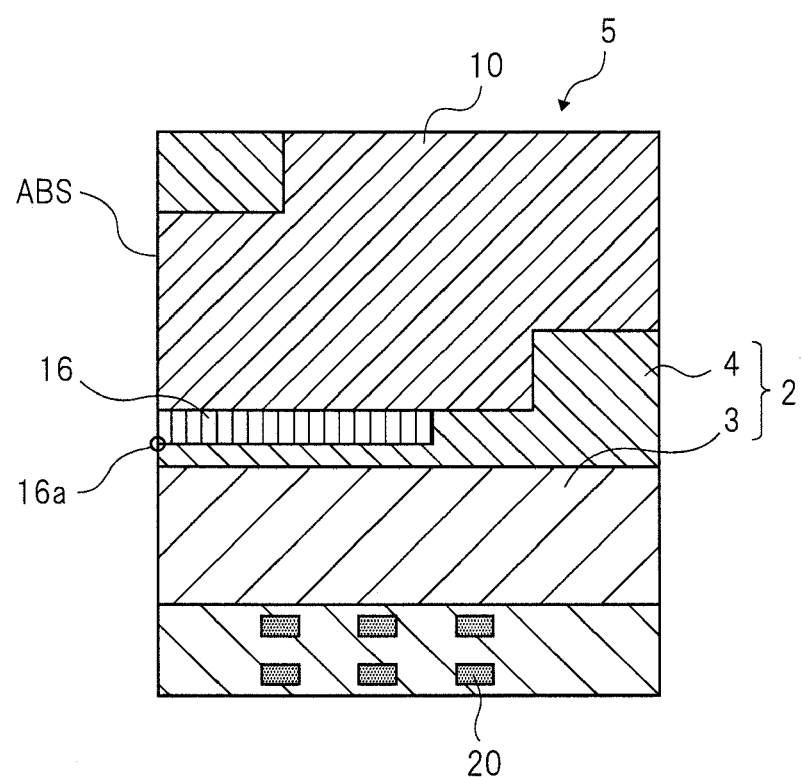
FIG. 1C is a schematic view of an A-A cross section of FIG. 1B.

FIG. 1A-FIG. 1C illustrate schematic configuration views of a thermally-assisted magnetic recording head. FIG. 1A is an appearance schematic view of a slider. FIG. 1B is a schematic view of the slider in the case when the thermally-assisted magnetic recording head is viewed from an ABS. FIG. 1C is a schematic view of an A-A cross section of FIG. 1B.

A slider 5 includes a thermally-assisted magnetic recording head 30 for perpendicular magnetic recording. The magnetic recording head 30 includes a magnetic recording element 21 having a magnetic pole 10 and a plasmon generator (PG) 16, and a waveguide 2 onto which light irradiated by a laser beam source (not illustrated) is incident. The PG 16 is made of Au or the like and has a V-shape projecting toward the core 3 on the ABS. In the magnetic pole 10 on the ABS, at least a portion on a PG 16 side has an inverted-triangular shape along the PG 16. The waveguide 2 is configured with the core 3 and a cladding layer 4 that is made of $Al_2O_3$ (alumina) or the like that surrounds the periphery of the core 3. An apex of the PG 16 at the position of closely facing the core 3 is a propagation edge 16b through which surface plasmon propagates. A near-field light generating part 16a is formed at an end part of the propagation edge 16b on an ABS side.

In the magnetic recording head 30, propagation light that is incident from the laser beam source (not illustrated) onto the core 3 and propagates through the core 3 couples to the PG 16 in a surface plasmon mode. Generated surface plasmon propagates along the propagation edge 16b toward the ABS and reaches the near-field light generating part 16a. The surface plasmon that has propagated generates near-field light at the near-field light generating part 16a, and a magnetic recording medium is locally heated. At the same time, the coil (not illustrated) generates a magnetic flux toward the magnetic recording medium in the magnetic pole 10, and writing of magnetic information to the magnetic recording medium is performed.

As described above, the formation of the PG 16 that has the V-shape projecting toward the core 3 allows high linear density recording to perform because the center of heating on the magnetic recording medium and the center of a magnetic field that is applied from the magnetic pole 10 to the magnetic recording medium get close to each other. The cladding layer 4 includes a heat generation coil 20 as a heat generation element. When the heat generation coil 20 generates heat, as illustrated by a broken line of FIG. 1A, the magnetic recording head 30 thermally expands and projects toward an ABS direction. Because the heat generation coil 20 need only expand the magnetic recording head 30, an arrangement position of the heat generation coil 20 may be discretionarily determined. Note, although not illustrated, the ABS is coated with diamond-like carbon (DLC).

Near-field light generated in the near-field light generating part 16a is an alternating electric field. It is assumed that an alternate equivalent circuit is configured with near-field light, the magnetic recording head 30, and the magnetic recording medium, and that the alternate equivalent circuit starts from the magnetic recording head 30, passes through the magnetic recording medium, and turns back to the magnetic recording head 30. It is considered that at that time a capacitor is configured with the near-field light generating part 16a and the magnetic recording medium. Therefore, it is considered that, alternating current becomes more likely to flow when the capacity of the capacitor is increased, so that the output of the laser beam source may be decreased, the capacitor being configured by the PG 16 and the magnetic recording medium, the laser beam source corresponding to a power source in the equivalent circuit.

Also, as a method of increasing the capacity of the capacitor, it is considered to arrange a dielectric body between the near-field light generating part 16a and the magnetic recording medium. In the present invention, a projection of the dielectric body is formed beforehand so as to cover the ABS of the PG 16, especially the near-field light generating part 16a. One of the methods of forming the projection of the dielectric body is a method of allowing lubricant 40 (for example, Z-tetraol 2000, TA-30, QA-40, and the like) that covers the surface of the magnetic recording medium to adhere to the ABS of the PG 16. When the laser beam source is activated, the magnetic recording medium 25 is heated, and the lubricant 40 is evaporated (see FIG. 2A). When the evaporated lubricant 40 adheres to the ABS of the PG 16, the projection of the dielectric body 40 is formed (see FIG. 2B). Then, when the magnetic recording medium 25 is continuously heated and/or when the temperature of heating the magnetic recording medium 25 is increased by increasing the laser output, the projection of the lubricant 40 that covers the ABS of the PG 16 grows (see FIG. 2C).

Figure 3A:
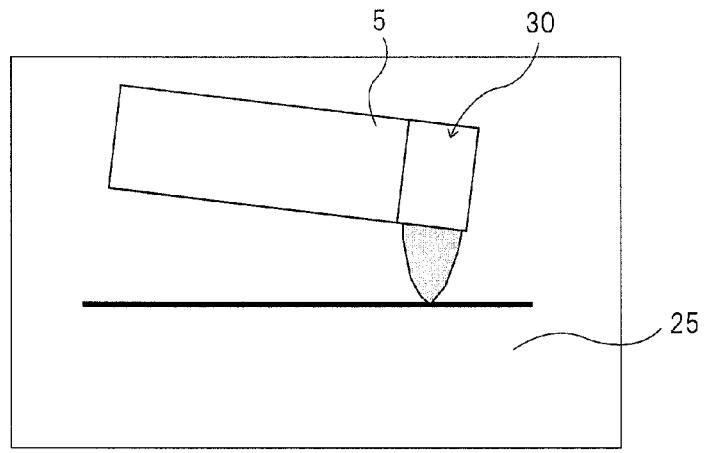
FIG. 3A is a schematic view that illustrates a state where a heat generation coil is activated to generate heat and a recording head part and a magnetic recording medium contact each other.
Figure 3B:
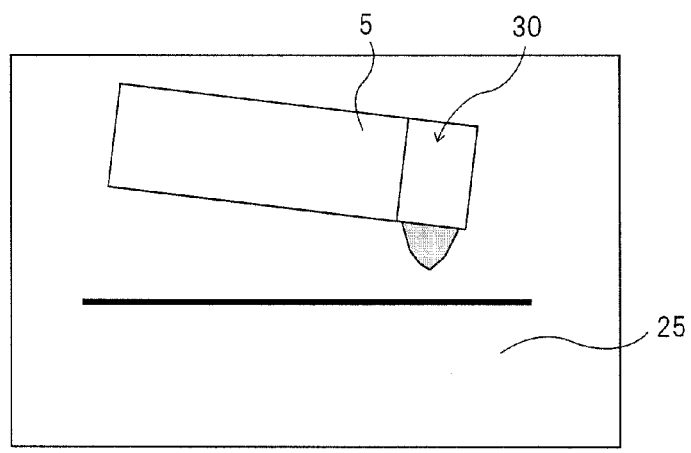
FIG. 3B is a schematic view that illustrates a state where power to input to the heat generation coil is decreased than the state of FIG. 3A and a gap is created between a magnetic recording element and the magnetic recording medium.
Figure 3C:
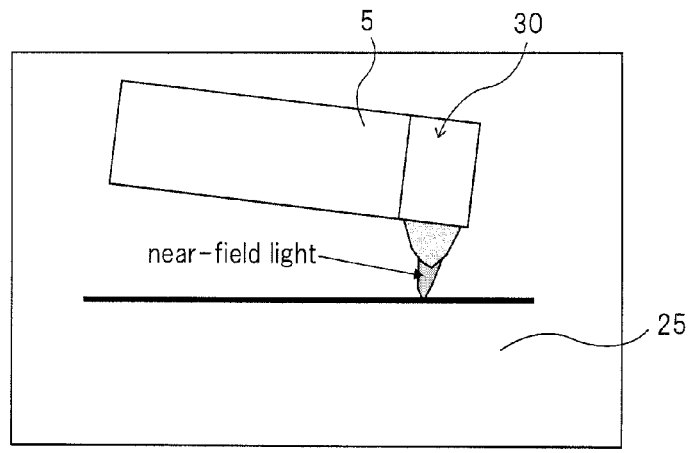
FIG. 3C is a schematic view that illustrates a state where a laser is activated and near-field light from a near-field light generating part heats the magnetic recording medium.

Next, specific descriptions are given of a method of forming the projection of the lubricant 40 with reference to FIG. 3A-FIG. 3C. Under the state where the magnetic recording head 30 flies above the magnetic recording medium 25, the heat generation coil 20 is activated to generate heat and then the magnetic recording head 30 is projected. Then, the magnetic recording head 30 and the magnetic recording medium 25 contact each other. The contact is detected by several ways, for example, by sensing a delay of rotation of a spindle motor (not-illustrated) that rotates the magnetic recording medium 25, by sensing the heat generation of the magnetic recording medium 25, which is caused when the magnetic recording head 30 contacts the magnetic recording medium 25, or by sensing vibration of the magnetic recording medium 25, which is caused by contacting the magnetic recording element 21 or the like (see FIG. 3A). Then, by decreasing the power to input to the heat generation coil 20 from such state, a gap is created between the magnetic recording element 21 and the magnetic recording medium 25. The size of the gap is arbitrarily controlled by adjusting the amount of power to decrease (see FIG. 3B). Then, under such state, the laser is activated, and the magnetic recording medium is heated by near-field light from the near-field light generating part 16a (see FIG. 3C).

Figure 2A:
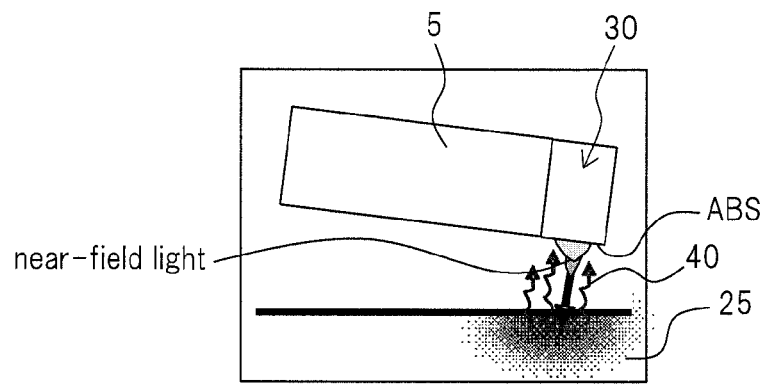
FIG. 2A is a schematic view that illustrates a status of heating a magnetic recording medium.
Figure 2B:
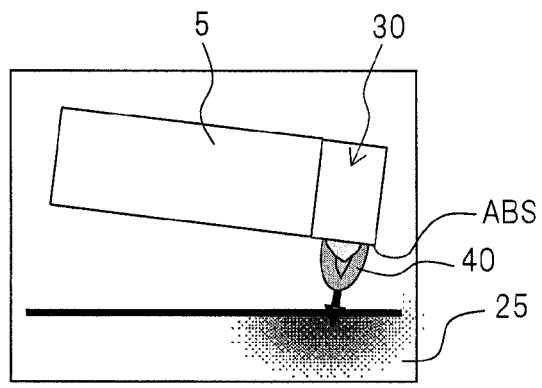
FIG. 2B is a schematic view that illustrates a status of forming a projection of a dielectric body with evaporated lubricant.
Figure 2C:
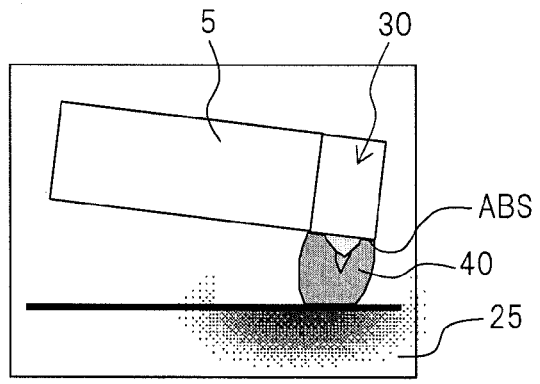
FIG. 2C is a schematic view that illustrates a status of forming a larger lubricant projection than the form of FIG. 2B.

Then, as described above, the lubricant 40 that covers the magnetic recording medium is evaporated, the evaporated lubricant adheres to the ABS of the PG 16, and the projection is formed (see FIG. 2A-FIG. 2C).

Note, the performance of irradiating light from the laser beam source and heating the magnetic recording medium 25 with near-field light from the near-field light generating part 16a without performing magnetic recording is referred to as hereinafter "dummy writing."

A magnetic recording head 30 of the present invention was manufactured. Descriptions of an example thereof are given hereinafter. Because the output of the laser beam source and the driving current of the laser beam source are in proportion to each other, in the present example, that driving current of the laser beam source is large is synonymous with that the output of the laser beam source is large.

Example

An execution procedure of the present example is as follows.

A: Inputting power to the heat generation coil 20; expanding the magnetic recording head 30; and contacting the magnetic recording medium 25 with the magnetic recording element 21.

B: Decreasing input power supply to the heat generation coil 20 by 80 mW from the state where the magnetic recording medium 25 and the magnetic recording element 21 contact each other; then starting irradiation of light from the laser beam source; gradually increasing driving current; experimentally performing recording; and stopping the increase of driving current of the laser beam source when the SNR exceeds 5 dB.

C: Irradiating light from the laser beam source for 75 seconds with a driving current $I_A$ when SNR exceeds 5 dB while maintaining the input power to the heat generation coil 20 (dummy writing); and stopping the driving of the laser beam source after the passage of 75 seconds.

D: While maintaining the input power to the heat generation coil 20, starting irradiation of light from the laser beam source again; gradually increasing driving current; and measuring the SNR.

Figure 4A:
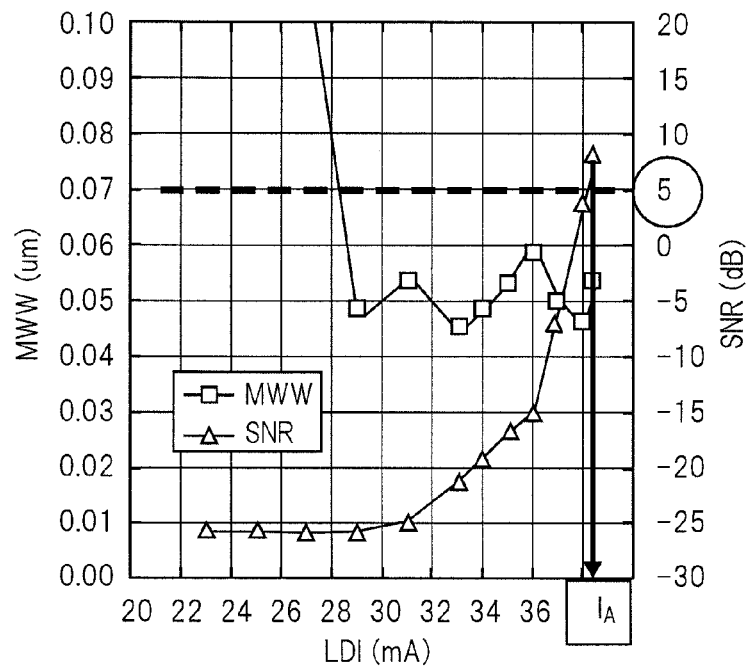
FIG. 4A is a graph that illustrates the relationship between the driving current of laser before dummy writing and the magnetic writing track width (MWW) and the relationship between the driving current of laser before dummy writing and the signal to noise ratio (SNR).
Figure 4B:
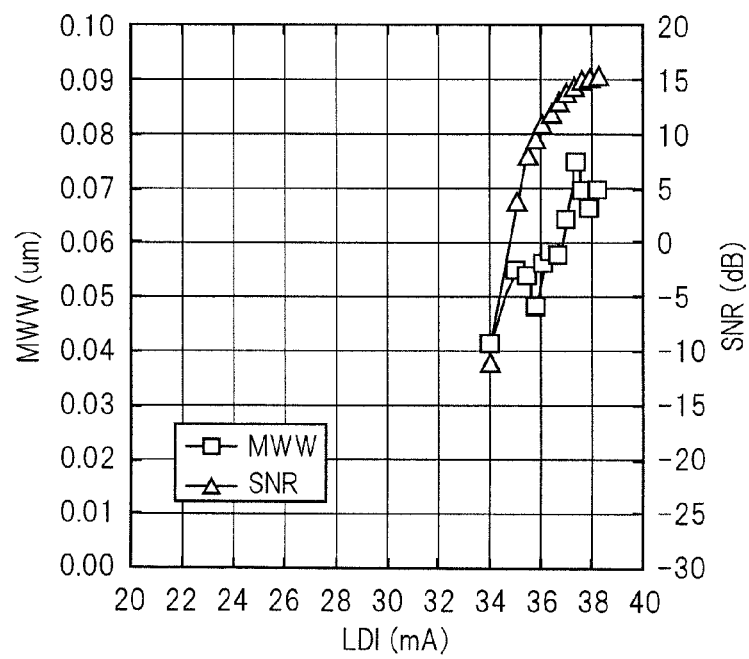
FIG. 4B is a graph that illustrates the relationship between the driving current of laser after dummy writing and the MWW and the relationship between the driving current of laser before dummy writing and the SNR.

FIG. 4A illustrates the result before the dummy writing; and FIG. 4B illustrates the result after the dummy writing. Note, the horizontal axes indicate the driving current of the laser beam source; left-side lateral axes indicate the magnetic writing track width (MWW); and right-side lateral axes indicate the SNR.

Compared to the results before and after the dummy writing, it is realized that the SNR improves even when the driving current of the laser beam source is the same. For example, the driving current of the laser beam source that is required for obtaining the SNR in excess of 5 dB was approximately 38 mA according to the result before the dummy writing, but on the other hand, was approximately 35 mA according to the result after the dummy writing. No significant variation was observed in the MWW between the results before and after the dummy writing.

Figure 5A:
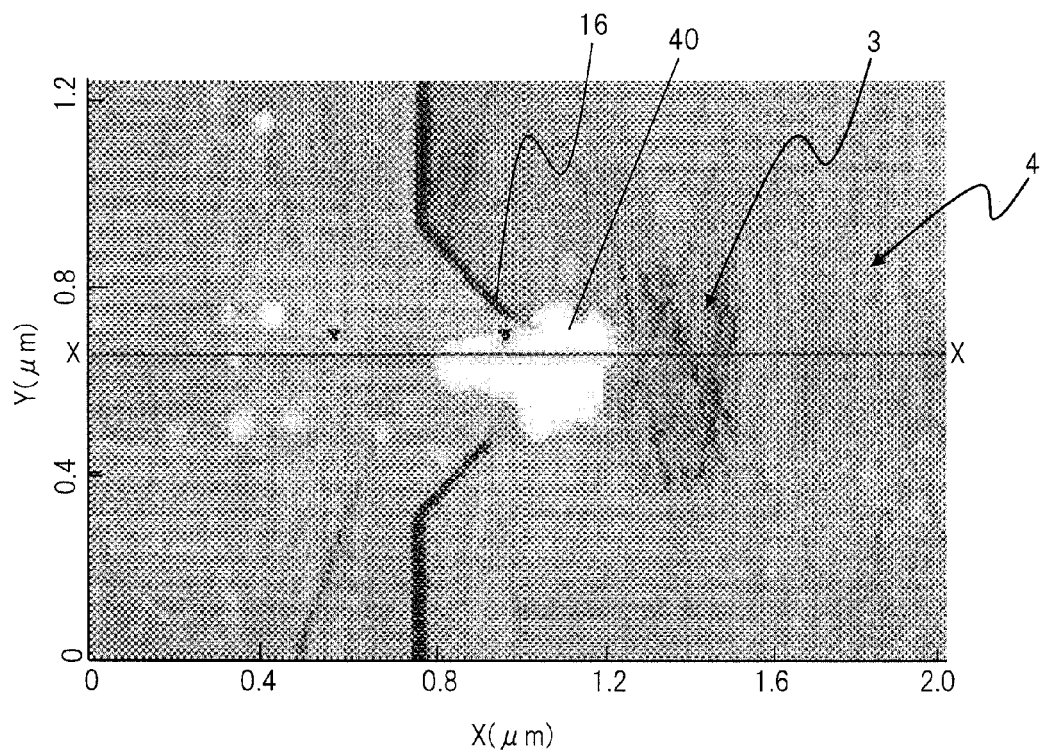
FIG. 5A is a figure that illustrates the observation result of a surface of the ABS of the recording head part after dummy writing.
Figure 5B:
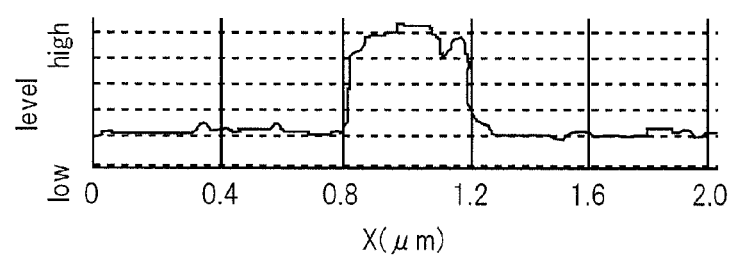
FIG. 5B is a graph that illustrates the profile of the variation of the height along X-X of FIG. 5A.

FIG. 5A illustrates the observation result of the surface of the ABS of the magnetic recording head 30 after the dummy writing. FIG. 5B illustrates the profile of the variation of the height along X-X of FIG. 5A. From FIGS. 5A and 5B, it is observed that the lubricant 40 adhered to the ABS of the PG 16.

As described above, when the dummy writing is performed and the dielectric body 40 adhered to the ABS of the PG 16, it allows to perform high quality recording that has large SNR with small driving current (output of the laser beam source) of the laser beam source. Also, because the driving current (output of the laser beam source) of the laser beam source is decreased, heat generation of the PG 16 is decreased.

Figure 6:
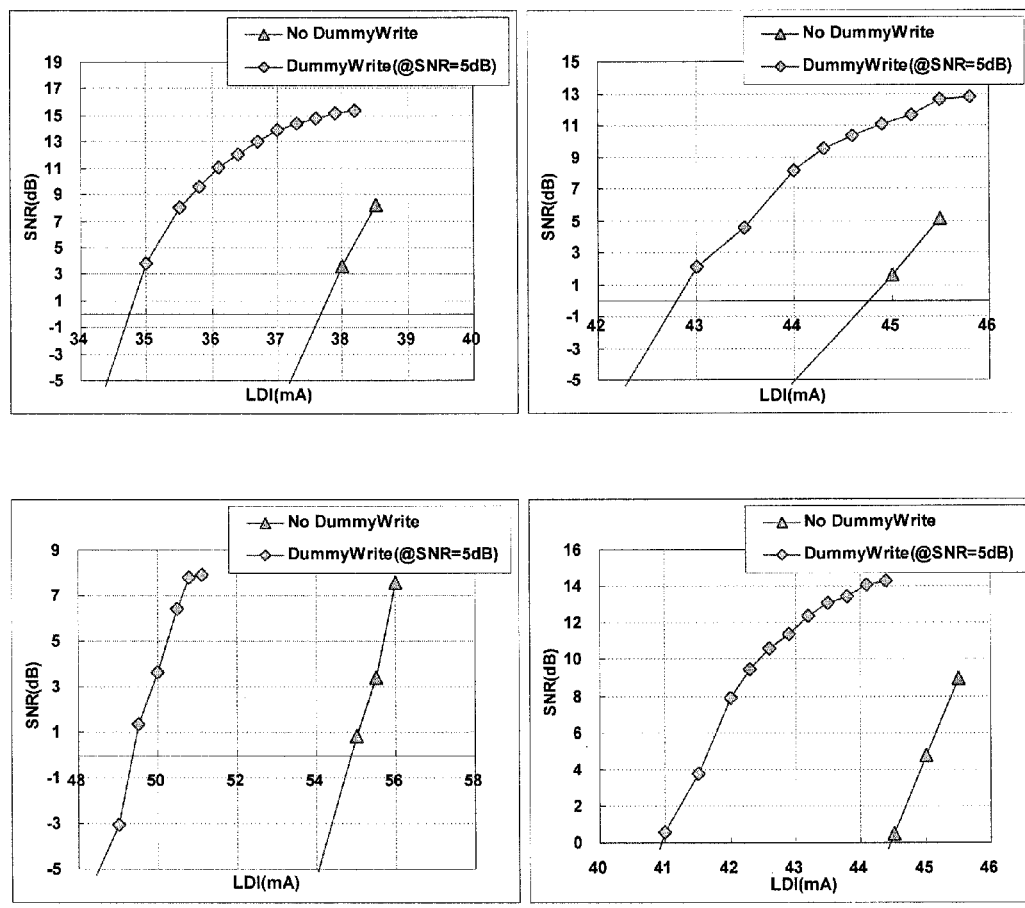
FIG. 6 are graphs that illustrate the validation results of the reproducibility of the dummy writing effect.

Next, the reproducibility of the dummy writing effect was validated. FIG. 6 illustrates the results. Note, an execution procedure thereof is the same as the one of the above-described example. Each of the graphs in FIG. 6 illustrates the results before and after the dummy writing.

According to the validation results illustrated in FIG. 6, compared to the results before the dummy writing, the results after the dummy writing show that higher SNR was obtained with smaller driving current (output of the laser beam source) of the laser beam source.

Next, the dummy writing was performed with various conditions, and the variation of the SNR between before and after the dummy writing was examined. FIG. 7 illustrates the results. Note, the amount of back-off (BO) indicates that the decreased amount of the heat generation of the heat generation coil 20 compared to the amount of the heat generation of the heat generation coil 20 when the magnetic recording element 21 contacts the magnetic recording medium 25. Also, the assumed spacing amount before driving a laser beam source indicates an assumed gap between the magnetic recording element 21 and the magnetic recording medium 25 when input power to the heat generation coil is decreased. Saturation (impregnation) of the SNR is defined as the state where an increase in the SNR is 1 dB/mA or less during increasing driving current of the laser beam source.

According to the experiment results, it is recognized that as the amount of BO becomes larger from 50 mW the decreased amount of driving current of the laser beam source that is necessary to saturate (impregnate) the SNR becomes larger.

When the duration of the dummy writing is longer, the effect of decreasing the driving current of the laser beam source becomes larger. When the driving current of the laser beam source is increased by 10% with the same amount of BO compared to the amount of driving current with which the SNR is saturated, the effect of decreasing driving current of the laser beam source is slightly larger and the duration that is needed for the SNR to saturate is shortened compared to when the driving current of the laser is decreased by 10% compared to the amount of driving current with which the SNR is saturated.

Furthermore, it is considered that, also in magnetic recording after the dummy writing, the effect of decreasing the driving current of the laser beam source becomes larger when the amount of BO is decreased compared to the amount of BO during the dummy writing.

Therefore, by performing the dummy writing and forming a projection of the dielectric body 40 on the ABS before performing magnetic recording, the projection covering the ABS of the PG 16 with the dielectric body 40, it allows to decrease the driving current (output of the laser beam source) of the laser beam source that is supplied during magnetic recording. Also, because it is possible to decrease the driving current (output of the laser beam source) of the laser beam source, it allows to decrease heat generation of the PG 16 and to prevent occurrence of damages of the magnetic recording head 30.

The above-mentioned descriptions of the specific embodiment of the present invention are disclosed only as examples. Those descriptions are not intended to limit the present invention to the as-disclosed embodiment. It is obvious for people skilled in the art that various variations and modifications are executable with reference to the contents of the above-described descriptions.

What is claimed is:

1. A thermally-assisted magnetic recording head that has an air bearing surface (ABS) that faces a magnetic recording medium, and that performs magnetic recording while heating the magnetic recording medium, comprising:
    a waveguide that includes a core through which light from a laser beam source propagates and a cladding that surrounds the periphery of the core;
    a magnetic pole that generates magnetic flux toward the magnetic recording medium;
    a plasmon generator that faces a part of the core and extends to the ABS, that couples to propagation light that propagates through the core in a surface plasmon mode, and that generates surface plasmon;
    a near-field light generating part that is an end part of the plasmon generator on the ABS side and that generates near-field light from the surface plasmon;
    a heat generation element that thermally expands the thermally-assisted magnetic recording head; and
    a dielectric body that covers at least a part of the plasmon generator positioned on the ABS.

2. The thermally-assisted magnetic recording head according to claim 1, wherein
    the dielectric body is lubricant that has adhered from a surface of the magnetic recording medium.

3. A manufacturing method of a thermally-assisted magnetic head that includes a waveguide through which light from a laser beam source propagates, a magnetic pole that generates magnetic flux, a plasmon generator that faces a part of the waveguide and extends to an air bearing surface (ABS) that faces a magnetic recording medium, and a near-field light generating part that is positioned at an end part of the plasmon generator on the ABS side, comprising:
    a step of generating near-field light at the near-field light generating part with light from the laser beam source;
    a step of heating the magnetic recording medium of which a surface is covered by lubricant with the near-field light, and of evaporating the lubricant; and
    a step of covering at least a part of the plasmon generator on the ABS with the evaporated lubricant, the ABS facing the magnetic recording medium.

4. The manufacturing method of the thermally-assisted magnetic recording head according to claim 3, wherein
    in the step of evaporating the lubricant, duration of heating the magnetic recording medium is set at five seconds or more and ten minutes or less.

* * * * *